United States Patent
Morris

(10) Patent No.: US 6,523,299 B2
(45) Date of Patent: Feb. 25, 2003

(54) MULCH AND METHOD OF MANUFACTURING MULCH

(75) Inventor: Samuel J. Morris, Dana, IL (US)

(73) Assignee: Phoenix Paper Products, Lostant, IL (US)

( * ) Notice: Subject to any disclaimer, the term of this patent is extended or adjusted under 35 U.S.C. 154(b) by 0 days.

(21) Appl. No.: 09/808,792

(22) Filed: Mar. 15, 2001

(65) Prior Publication Data

US 2002/0129545 A1 Sep. 19, 2002

(51) Int. Cl.$^7$ .................................................. A01G 7/00
(52) U.S. Cl. ............................................................. 47/9
(58) Field of Search ................................................ 47/9

(56) References Cited

U.S. PATENT DOCUMENTS

| | | |
|---|---|---|
| 2,708,418 A | 5/1955 | Sugarman et al. |
| 3,269,824 A | 8/1966 | Aswell |
| 3,828,731 A | 8/1974 | White |
| 3,876,411 A * | 4/1975 | Fowler ........................ 71/11 |
| 4,067,140 A | 1/1978 | Thomas |
| 4,278,047 A | 7/1981 | Luca |
| 4,409,925 A | 10/1983 | Brundrett et al. |
| 4,458,629 A | 7/1984 | Gerber |
| 4,570,573 A | 2/1986 | Lohman |
| 4,619,862 A | 10/1986 | Sokolowski et al. |
| 4,676,196 A | 6/1987 | Lojek et al. |
| 4,721,059 A | 1/1988 | Lowe et al. |
| 4,931,139 A | 6/1990 | Phillips |
| 5,082,563 A | 1/1992 | Webb et al. |
| 5,188,064 A | 2/1993 | House |
| 5,192,587 A | 3/1993 | Rondy |
| 5,195,465 A | 3/1993 | Webb et al. |
| 5,209,186 A | 5/1993 | Dewing |
| 5,215,041 A | 6/1993 | Krahenbuhl |
| 5,358,607 A | 10/1994 | Ellis |
| 5,396,731 A | 3/1995 | Byrne |
| 5,429,741 A | 7/1995 | Webb et al. |
| 5,443,612 A | 8/1995 | Havens |
| 5,456,733 A | 10/1995 | Hamilton, Jr. |
| 5,458,877 A * | 10/1995 | Obayashi et al. ........ 424/195.1 |
| 5,672,434 A | 9/1997 | Dalebroux et al. |
| 5,779,782 A | 7/1998 | Spittle |
| 6,029,395 A * | 2/2000 | Morgan ........................ 47/9 |

* cited by examiner

Primary Examiner—Peter M. Poon
Assistant Examiner—Son T. Nguyen
(74) Attorney, Agent, or Firm—King & Jovanovic, PLC

(57) ABSTRACT

A mulch for use in association with the germination of seed comprising paper particles and corn particles. The paper and corn particles are intimately mixed into a substantially uniform mulch. The mulch may be compressed into a pellet form. Additionally, the invention includes a method of manufacturing the mulch.

30 Claims, 1 Drawing Sheet

MULCH AND METHOD OF MANUFACTURING MULCH

BACKGROUND OF THE INVENTION

1. Field of the Invention

This invention is directed primarily to a mulch, and more particularly to a mulch composition intended for use in association with the germination of seeds, such as, for example, flowers and grass.

2. Background Art

Planting grass seed for a lawn or flower seed for a flower bed along a patch of land is common during warmer weather. Among other problems that are encountered, it is difficult to maintain proper hydration so that the seeds germinate. In addition, it is also desirable to provide an aesthetic appearance to the area prior to germination of the seeds.

Indeed, various solutions have been proposed to solve these problems. For example, certain solutions have applied a shredded paperboard or wood based mulch product either with the seeds or after the seeds have been applied. In certain forms, the mulch comprises a "fluff" product that is hydrated and then applied by hydroseed applicators. In other forms, the mulch comprises a pelleted product that is applied either by hand or by a spreader, much like granules of fertilizer. These products have the ability to absorb relative large quantities of water, to, in turn, maintain proper hydration for the seeds, dissipate the energy of rain drops, and protect the seedling.

To improve appearance, these products include a dye which may be green (to simulate grass) or pink (to simulate flowers). As the mulch product is generally biodegradable, it is envisioned that, as the seeds germinate, the mulch will degrade into the underlying soil.

While these products have been helpful, certain problems continue to exist. In particular, among other problems, commonly used mulches rob the ground of nutrients necessary to the healthy development of the seeds. Additionally, it has been difficult to provide a mulch which suitably covers the seed and degrades at a desired rate, i.e. not too fast, nor too slow. Lastly, commonly used pellet mulches do not adequately absorb water, thus requiring more frequent and heavier watering to ensure proper hydration of the seed.

Accordingly, it is an object of the present invention to provide for a mulch product which minimizes the quantity of nutrients which are absorbed from the surroundings.

It is another object of the invention to provide for a mulch product which includes enhanced degradation characteristics relative to the germination of seeds.

It is another object of the invention to provide a mulch which enhances the germination of seeds.

These and other objectives will become apparent in light of the specification and claims appended hereto.

SUMMARY OF THE INVENTION

The invention comprises a mulch for use in association with the germination of seed. The mulch comprises paper particles and corn particles, wherein the paper and corn particles are intimately mixed into a substantially uniform mulch.

In one preferred embodiment of the invention, the mulch includes a tackifier/binder. Preferably, the tackifier/binder comprises one of, for example, swellable guar gum, plantego gum, vegetable gums, starch or synthetic water polymers. In such an embodiment, the tackifier/binder content is between 0 and 3% by weight.

In another preferred embodiment, the mulch further comprises a surfactant. Preferably, the surfactant is one of the following: non-ionic, cationic, or anionic surfactants. In any such embodiment, the surfactant content is between 0 and 0.5% by weight.

In one embodiment, the paper comprises a shredded paper. In one such embodiment, the paper comprises one of the group consisting of: paperboard, cardboard, newspaper and recycled paper. Preferably, the paper content ranges between 30 and 95% by weight.

In one preferred embodiment, the corn particles comprises at least one of corn stalks and corn husks. In another preferred embodiment, the mulch includes a dye. Preferably, the dye consists of one of the following colors: pink, green, blue-green, red, purple, yellow and combinations of the foregoing.

In another aspect of the invention, the mulch product comprises a pelleted material which includes a mixture of paper particles and corn particles. Generally, the pellets comprise 15 to 98% by weight paper particles. In another embodiment of the invention, the pellets generally comprise 2 to 85% by weight corn particles.

In a preferred embodiment, the pellets generally include a length of about 1/8 to 1 inches. The pellets are typically crumbled to provide a flowable material which provides a better coverage rate and water absorption rate. Further, the pellets generally include a circular cross-sectional configuration.

In another embodiment of the invention, the pellets further comprise a tackifier/binder. The tackifier preferably comprises about 0 to 3% by weight of the mulch. Additionally, the mulch may include a surfactant. In one such embodiment, the surfactant comprises about 0 to 0.5% by weight of the mulch.

The invention likewise comprises a method of manufacturing a mulch. The method comprises the steps of: providing paper particles, providing corn particles; and mixing the paper and corn mulch particles into a mulch.

In one preferred embodiment, the method further comprises the step of pelletizing the mixed paper particles and corn particles.

In yet another preferred embodiment, the method includes the step of mixing a tackifier with at least one of the paper particles and the corn particles.

Preferably, the method further comprises the step of mixing a surfactant with at least one of the paper particles and the corn particles.

BEST MODE FOR PRACTICING THE INVENTION

Figure 1:
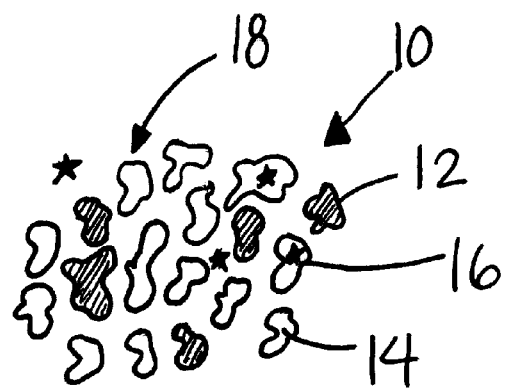
FIG. 1 of the drawings is a top plan view of the mulch of the present invention.

While this invention is susceptible of embodiment in many different forms, there is shown in the drawings and will be described in detail, two specific embodiments with the understanding that the present disclosure is to be considered as an exemplification of the principles of the invention and is not intended to limit the invention to the embodiments illustrated.

Referring now to the Figures, and in particular FIG. 1, seed mulch 10 is shown in FIG. 1 as comprising paper particles 12, corn particles 14, tacifier 16 and dye 18. Seed mulch 10 is used in association with the germination of seed, such as, for example in association with grass or flower beds. Of course, the mulch is not limited to any particular seed or particular application, and, other uses of the above-identified mulch may be contemplated for use.

Paper particles, such as paper particle 12, are shown in FIG. 1 as comprising shredded paper. Various types of shredded paper are contemplated for use including new or recycled newsprint, copy paper, card stock, cardboard, corrugated cartons, among others. While the preferred material comprises recycled newsprint, due to performance and cost, the other paper products are likewise suitable for use. Such paper products can often be purchased in bulk and shredded on-site. While not specifically limited thereto, the content of paper particles in the mulch ranges between 15 and 98% by weight and preferably about 80–90%.

Corn particles 14 are shown in FIG. 1 as comprising a mulch primarily comprising corn stalks and corn husks. While not specifically limited thereto, the content of corn particles in the mulch ranges between 2 and 85% by weight and preferably about 10–20%. A large portion of the stalks comprises a substantially absorbent sponge-like cellular material which has a relatively low density. In certain embodiments, the corn particles may additionally be treated with surfactant (which ranges between 0 and 0.5% by weight of the mulch), which enhances the absorbency characteristics of the corn particles. Various surfactants may include, for example, cationic, non-anionic and anionic. Furthermore, in certain embodiments, the corn particles may be dyed, with, for example a green dye to promote consistent color in the mulch. Such corn particles can be obtained from Mat Fiber, Inc. under the name Amerifibers.

Tackifier/binder 16 is shown in FIG. 1 as comprising a polymer, such as guar gum. Of course various tackifiers are contemplated for use, including but not limited to guar gum, plantego gum, vegetable gums, starch or synthetic water swellable polymers. Generally, the tackifier/binder content is between 0 and 3% by weight. As will be explained in detail below, the tackifier facilitates binding of the mulch with the ground, and the retention of water within the mulch.

Dye 18 generally comprises any number of dyes which are approved for use in a mulch application. Common colors for the dye may comprise green to simulate grass or pink to simulate a flower bed. Of course depending on the application, different color dye can be utilized to achieve a particular effect. The color of the dye generally does not have an effect on the performance of the mulch; rather the dye facilitates an aesthetic appearance.

To manufacture the seed mulch the paper particles and the corn particles are intimately mixed. Mixing may require the shredding of the various particles until they reach a size of, for example 1/8" by 1¼". Of course, depending on the application, the particles may be larger or smaller than the foregoing size. Moreover, depending on the inherent water content of the particles, it may further be necessary to mist water upon the paper and/or the corn particles so that the proper hydration for pelleting is achieved.

Once these particles are mixed, tackifier/binder 16 is introduced into the mixed mulch. Generally, the tackifier/binder may be in solution, or, alternatively, may comprise a solid powder. In other embodiments, the tacifier/binder can be mixed at the same time that the paper particles and corn particles are combined. Further still, in other embodiments, the tacifier/binder can be mixed with either of the paper particles or the corn particles prior to the mixing of the paper and corn particles with each other. Similarly, a suitable dye may then be injected into the mixture.

Figure 2:
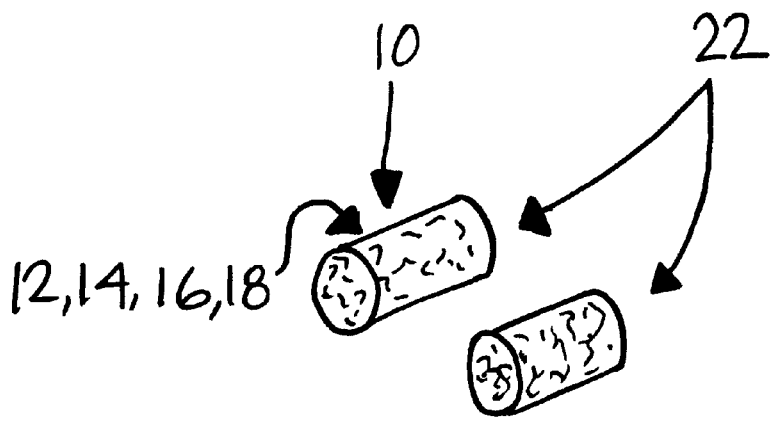
FIG. 2 of the drawings is a perspective view of the mulch of the present invention in a pelletized form.

Once the paper, corn, tacifier/binder and dye are mixed together, the mixture is pelleted in a pelleting press. The press produces pellets, such as pellets 22 shown in FIG. 2, which range between 1/8 and 1½ inches in length and whose substantially circular cross-section ranges between 1/8 and 3/8 inches in diameter. Of course, in certain embodiments, the dimensions of the individual pellets can be outside of the preferred ranges, and, additionally, the invention is not limited to circular cross-sections.

The pellets are then dried at ambient temperature or at an elevated temperature wherein the water content of the pellets ranges between about 4 and 15% by weight, such that the fibers comprise at least 97% of the weight of the resulting mulch. Once dried, the mulch is packaged in containers and prepared for shipping. It will be understood that in certain embodiments, either seed or fertilizer can be introduced into the mulch prior to pelleting and after pelleting. In other embodiments, grass seed (or other seeds) and/or fertilizer may be mixed into the completed pelleted mulch.

Figure 3:
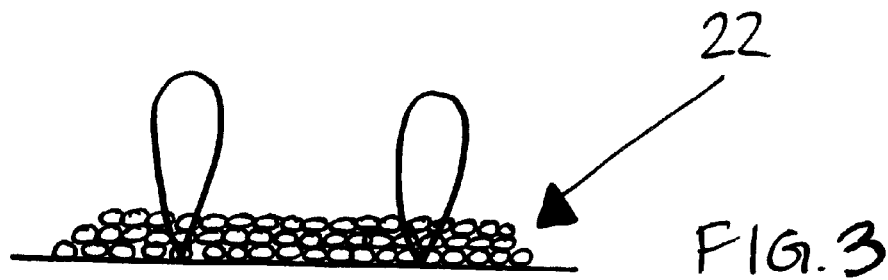
FIG. 3 of the drawings is a side elevational view of the mulch of the present invention in use.

In operation, as shown in FIG. 3, pelleted mulch 22 is applied to the soil after an application of grass seed or other seed (of course, the application of grass can be simultaneous with the application of the pelleted product). The pelleted mulch may be applied manually or by way of a spreading apparatus, either dry or hydraulically.

In dry applications, the pelleted mulch is hydrated, for example, by way of watering with a sprinkler or a conventional hose, or by rain fall. As the mulch is moistened, the pelleted mulch absorbs water and begins to expand and break apart. The particular corn and paper constituents accelerate the absorption of water, as the lower density facilitates the wicking into the fibers themselves.

The water likewise interacts with the tackifier/binder, to, in turn, form a shell-like shield to minimize the rate of evaporation of water from within the mulch. Moreover, the tackifier/binder likewise facilitates the binding of the mulch to the ground, to minimize movement of the mulch and seed relative to the ground. For example, the use of the above-identified tackifier/binder facilitates the application of the mulch on inclined surfaces where runoff erosion is a concern. Moreover, this bonding effect dissipates the energy associated with raindrops and/or irrigation, thereby protecting the seeds and improving germination. Further still, as the tackifier cures, it acts as a seal over the mulch to lower the evaporation rate and to improve the hydration of the mulch. Due to the relatively quick water absorption characteristics of the corn and paper combination, and the surface area of the pellets, substantially less tackifier/binder can be utilized (as compared to conventional clay/paper, straw paper, wood paper mulches).

Advantageously, the Carbon to Nitrogen ratio of the mulch produced in accordance with the present invention is lower than that of conventional mulches. For this reason, the mulch of the present invention does not compete with new seedlings for nutrients that are naturally in the soil, or in the fertilizer. Moreover, the lower ratio enhances the decomposition of the mulch, which increases the organic content of the soil and improves overall soil conditions.

In other embodiments, the mulch may be used in a mixed, yet not pelleted form. In such applications, the mulch is applied by way of hydroseed applicators to the area to be treated. In such an application, the mulch is generally hydrated than sprayed out of a device through its nozzle. Due to the improved water absorption characteristics identified above, the mulch of the present invention will not tend to plug the nozzle even in an under-mixed condition.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A mulch for use in association with the germination of seed comprising:
    fibers composed of:
        about 15 to 98% by weight paper particles; and
        about 2 to 85% by weight corn particles; and
        about 4 to 15% by weight water hydrating the fibers;
        wherein the paper and corn particles are intimately mixed into a substantially uniform mulch, and wherein the hydrated fibers comprise at least 97% of the weight of the resulting mulch.

2. The mulch product of claim 1 further comprising a tackifier/binder.

3. The mulch product of claim 2 wherein the tackifier/binder comprises one of the group consisting of: guar gum, plantego gum, vegetable gums, starches and water-swellable polymers.

4. The mulch product of claim 2 wherein the tackifier content is between 0 and 3% by weight.

5. The mulch product of claim 1 further comprising a surfactant.

6. The mulch product of claim 5 wherein the surfactant is selected from one of the group consisting of: anionic, cationic and non-ionic.

7. The mulch product of claim 5 wherein the surfactant content is between 0 and 0.5% by weight.

8. The mulch product of claim 1 wherein the paper particles comprise shredded paper.

9. The mulch product of claim 8 wherein the paper particles comprise one of the group consisting of: paperboard, cardboard, newspaper and recycled paper.

10. The mulch product of claim 1 wherein the corn particles comprise at least one of corn stalks and corn husks.

11. The mulch product of claim 1 further comprising a dye.

12. The mulch product of claim 11 wherein the dye consists of one of the following colors: pink, green, blue-green, red, purple, yellow and combinations of the foregoing.

13. The mulch product of claim 1 wherein the paper particles comprise between about 80 to 90% by weight.

14. The mulch product of claim 1 wherein the corn particles comprise between about 10 to 20% by weight.

15. A pelleted mulch product comprising:
    fibers composed of:
        paper particles, wherein the paper particles comprise about 15 to 98% by weight; and
        corn mulch particles, wherein the corn particles comprise about 2 to 85% by weight, and
        about 4 to 15% by weight water hydrating the fibers;
        wherein, the hydrated fibers comprise at least 97% of the weight of the resulting mulch and wherein the paper particles and corn particles are mixed and pelleted.

16. The mulch product of claim 15 wherein the pellets generally include a length of about 1/8 to 1 1/2 inches.

17. The mulch product of claim 15 wherein the pellets generally include a circular cross-sectional configuration.

18. The mulch product of claim 15 wherein the pellets further comprise a tackifier/binder.

19. The mulch product of claim 15 wherein the tackifier/binder comprises about 0 to 3% by weight of the mulch.

20. The mulch product of claim 15 further comprising a surfactant.

21. The mulch product of claim 15 wherein the surfactant comprises about 0 to 0.5% by weight of the mulch.

22. The mulch product of claim 15 wherein the paper particles comprise between about 80 to 90% by weight.

23. The mulch product of claim 15 wherein the corn particles comprise between about 10 to 20% by weight.

24. The mulch product of claim 15 further comprising water, wherein the water comprises about 4 to 15% by weight.

25. A method for manufacturing a mulch product comprising the steps of:
    providing fibers composed of paper particles and corn particles;
    mixing the paper and corn mulch particles such that the paper particles comprise about 15% to 98% by weight, and the corn particles comprise about 2% to 85% by weight; and
    hydrating the paper particles and corn particles such that the water content is about 4 to 15% by weight,
    wherein the hydrated fibers comprise at least 97% of the weight of the resulting mulch.

26. The method of claim 25 further comprising the steps of:
    pelletizing the mixed paper and corn particles.

27. The method of claim 25 further comprising the step of mixing a tacifier with at least one of the paper particles and the corn particles.

28. The method of claim 25 further comprising the step of mixing a surfactant with at least one of the paper particles and the corn particles.

29. The method of claim 25 wherein the paper particles comprise between about 80 to 90% by weight.

30. The method of claim 25 wherein the corn particles comprise between about 10 to 20% by weight.

* * * * *